US010223209B2

(12) United States Patent
Adkins (10) Patent No.: US 10,223,209 B2
(45) Date of Patent: *Mar. 5, 2019

(54) SPLITTING A CLONE HAVING SNAPSHOTS FROM A PARENT

(71) Applicant: International Business Machines Corporation, Armonk, NY (US)

(72) Inventor: Janet E. Adkins, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 752 days.

This patent is subject to a terminal disclaimer.

(21) Appl. No.: 14/861,087

(22) Filed: Sep. 22, 2015

(65) Prior Publication Data

US 2017/0004048 A1    Jan. 5, 2017

Related U.S. Application Data

(63) Continuation of application No. 14/754,874, filed on Jun. 30, 2015, now Pat. No. 9,996,424.

(51) Int. Cl.
*G06F 17/30* (2006.01)
*G06F 11/14* (2006.01)

(52) U.S. Cl.
CPC ...... *G06F 11/1451* (2013.01); *G06F 11/1448* (2013.01); *G06F 17/30088* (2013.01); *G06F 17/30129* (2013.01); *G06F 2201/84* (2013.01)

(58) Field of Classification Search
CPC .......... G06F 11/1451; G06F 17/30129; G06F 11/1448; G06F 17/30088; G06F 2201/84
See application file for complete search history.

(56) References Cited

U.S. PATENT DOCUMENTS

| 8,046,534 B2 | 10/2011 | Xu et al. |
| 8,396,832 B2 | 3/2013 | Adkins et al. |
| 8,650,158 B2 | 2/2014 | Adkins et al. |
| 2005/0178297 A1 | 8/2005 | Pipkin |
| 2010/0250493 A1 | 9/2010 | Adkins et al. |
| 2012/0005162 A1 | 1/2012 | Adkins et al. |
| 2012/0066183 A1 | 3/2012 | Adkins et al. |
| 2013/0275693 A1 | 10/2013 | Bello et al. |

(Continued)

FOREIGN PATENT DOCUMENTS

WO    2014130035 A1    8/2014

OTHER PUBLICATIONS

VMware: Knowlege Base, "Changing a monolithic disk to a split disk in VMware Workstation (2006898)," http://kb.vmware.com/selfservice/microsites/search.do?language=en_US&cmd=displayKC&externalId=2006898, printed on Jul. 24, 2015, pp. 1-2.

(Continued)

*Primary Examiner* — Albert M Phillips, III
(74) *Attorney, Agent, or Firm* — Teddi E. Maranzano (57) ABSTRACT

A method, system, and program product is provided for splitting a clone object from a parent object when the clone object includes at least one snapshot. A mapping is created of a source data block from the parent object to a destination data block in the clone object. A creation generation in the mapped source data block is compared to an isolate generation in the destination data block in the clone object. Inherited data blocks in the clone object are isolated from the parent object, based on the creation generation differing from the isolate generation. The destination block is updated with the mapping information.

5 Claims, 6 Drawing Sheets (56) References Cited

U.S. PATENT DOCUMENTS

2014/0244935 A1  8/2014  Ezra et al.
2015/0134616 A1  5/2015  Zheng et al.
2015/0178297 A1  6/2015  Adkins et al.

OTHER PUBLICATIONS

Github, "Feature Request—online split clone #2105," https://github.com/zfsonlinux/zfs/issues/2105, printed on Jul. 24, 2015, pp. 1-2.
Netapp Knowledgebase, "FAQ—FlexClone split," https://kb.netapp.com/support/index?page=content&id=3013526&pmv=print&impressions=false, KB ID: 3013526, Version 7.0, Jun. 20, 2014, pp. 1-3.
Oracle, "WorkingWith Oracle Solaris ZFS Snapshots and Clones," Oracle Solaris ZFS Administration Guide, Sep. 2010, pp. 203-217.
Adkins, "Splitting a Clone Having Snapshots From a Parent," U.S. Appl. No. 14/754,874, filed Jun. 30, 2015, 28 pages.
IBM: List of IBM Patents or Patent Applications Treated as Related (Appendix P), Sep. 22, 2015, 2 pages.
Osuna, "An Introduction to FlexCone Volumes", Introduction/Overview, IBM, Redbooks Paper, ibm.com/redbooks, 2006, pp. 1-50.
Brookman, "Splitting off a NetApp FlexCone Volume to Create an Independent Volume", May 6, 2011, 6 pages.
Garimella, "Understanding and exploiting snapshot technology for data protection, Part 1: Snapshot technology overview", Apr. 26, 2006, 18 pages.

SPLITTING A CLONE HAVING SNAPSHOTS FROM A PARENT

BACKGROUND

This disclosure relates generally to computer system filesystem management, and more particularly to splitting a clone having snapshots from a parent.

Redirect-on-write (ROW) file systems write modified data to new storage locations rather than modifying the data in a previous location or copying original data prior to making the modification. A snapshot of a file system object is created by having the snapshot point to the same locations for the data. A new modification of the object writes the data to a new location and leaves the snapshot's point-in-time view unchanged. For unchanged data this operation can result in sharing data blocks, where more than one object points to the same data block in the file system.

A clone of a snapshot can be created which starts pointing to all of the same data as the snapshot. Unlike the snapshot, the clone can be modified. With ROW, a block modified in the clone results in a new block being allocated to the clone but no change to the snapshot. A clone can itself have a snapshot created from it as well. For unchanged data, more than one object can point to the same data block in the file system.

Sharing of data blocks presents an issue when splitting the connection between a clone and its parent snapshot or from the clone and its child objects. Generally, in splitting a clone from its parent snapshot, all blocks shared between the clone and its parent snapshot are located, and each block is duplicated to a new location for the clone to address. The object referring to the block is updated to point to the new location.

For a clone having snapshots, the blocks inherited from the clone's parent snapshot can be shared between the clone and all of the clone's snapshots, or only a subset of the clone's snapshots. If each occurrence of a block is moved to a new location, then available space in the file system can be exhausted since multiple copies of the same block are needed.

SUMMARY

According to one embodiment, a computer-implemented method for splitting a clone object from a parent object whereby the clone object includes at least one snapshot, is provided. The method includes creating a mapping of a source data block from the parent object to a destination data block in the clone object, comparing a creation generation in the mapped source data block to an isolate generation in the destination data block in the clone object, isolating in the clone object an inherited data block from the parent object based on the creation generation differing from the isolate generation, and updating the destination data block in the clone object.

In another embodiment, a computer program product for splitting a clone object from a parent object whereby the clone object includes at least one snapshot is provided. The computer program product provides a computer readable storage medium readable by a processing circuit and storing instructions for execution by the processing circuit for performing a method. The method includes creating a mapping of a source data block from the parent object to a destination data block in the clone object, comparing a creation generation in the mapped source data block to an isolate generation in the destination data block in the clone object, isolating in the clone object an inherited data block from the parent object based on the creation generation differing from the isolate generation, and updating the destination data block in the clone object.

According to another embodiment, a computer system for splitting a clone object from a parent object whereby the clone object includes at least one snapshot is provided. The computer system includes a memory, a processing unit communicatively coupled to the memory, and a management module communicatively coupled to the memory and processing unit, whereby the management module is configured to perform the steps of a method. The method includes creating a mapping of a source data block from the parent object to a destination data block in the clone object, comparing a creation generation in the mapped source data block to an isolate generation in the destination data block in the clone object, isolating in the clone object an inherited data block from the parent object based on the creation generation differing from the isolate generation, and updating the destination data block in the clone object.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
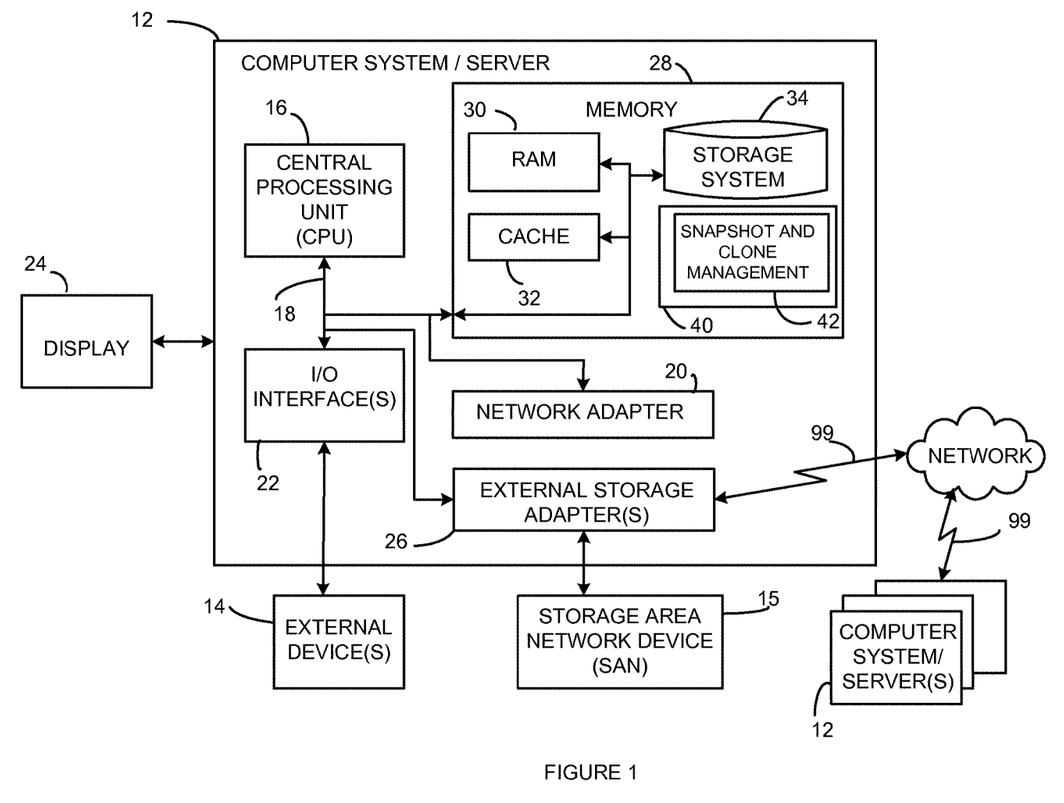
FIG. 1 illustrates an exemplary computing node operable for various embodiments of the disclosure.

FIG. 1 illustrates a block diagram of an exemplary computer system (i.e., server) 12 operable for various embodiments of the disclosure. As shown, the server 12 is only one example of a suitable computer for splitting a clone having snapshots from a parent and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules, components, objects, logic, or data structures, for example, being executed by the processing unit 16 to control the operation of the server 12. Snapshot and clone management 42 may be implemented as a kernel extension to the OS 40. At least a portion of the OS 40 and snapshot and clone management 42 may be specialized to execute the algorithm of FIGS. 4-5.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. Snapshot and clone management 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. However, in a multi-tenant datacenter (MTD) environment, such as a cloud computing environment, network communications may be routed through the member servers 12 and virtual machines through both physical devices (e.g., network adapters network switches), and virtualized networks, such as those implemented using software defined networking (SDN).

External storage adapter 26 connects the server 12 with external storage subsystems, such as a storage area network (SAN) 15 or RAID array. A portion of SAN 15 or the storage system 34 may be reserved for snapshot and clone creation and management. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
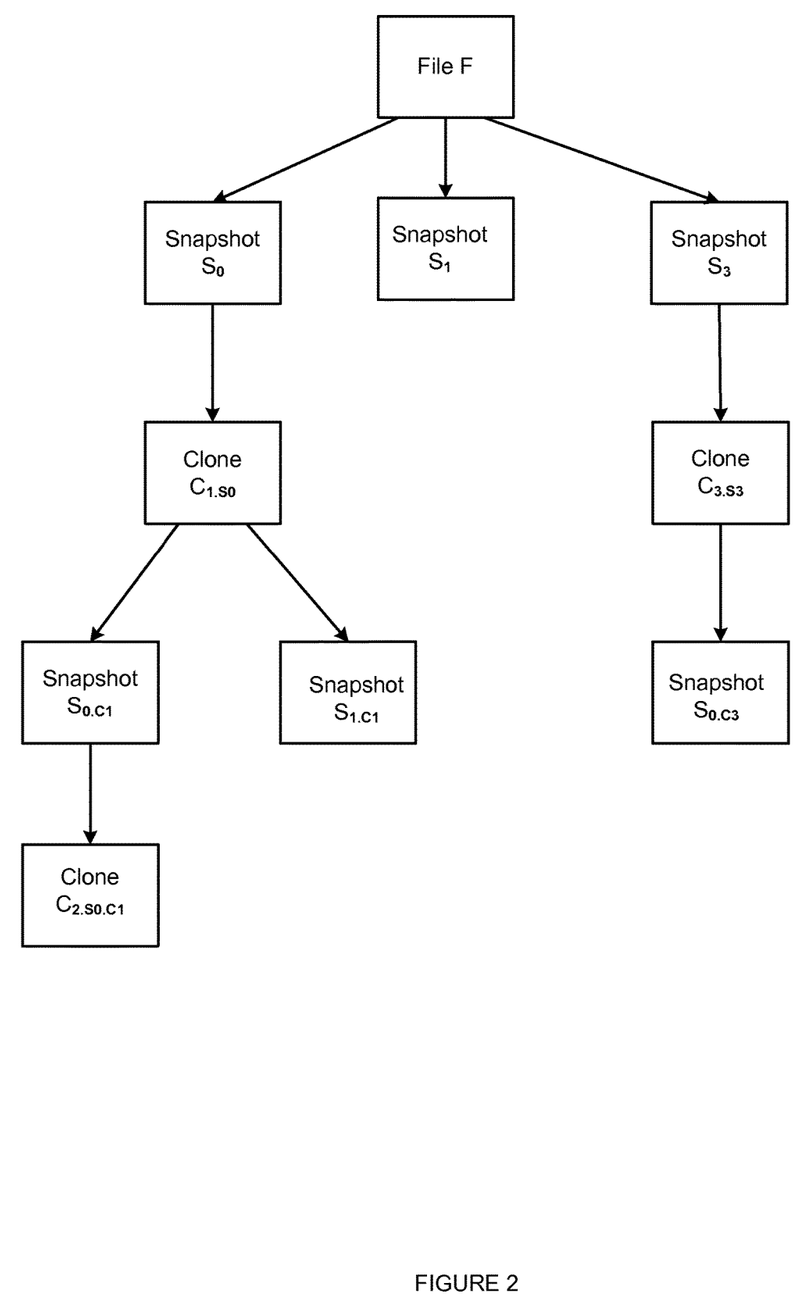
FIG. 2 illustrates a logical snapshot and clone hierarchy.

FIG. 2 shows an exemplary logical snapshot and clone hierarchy as a logical subtree structure. File F is the root and parent of all the objects shown. Each clone is also a root and parent of a logical subtree including itself and its descendants. For example, other logical subtrees include:

$C_{1,s0}, S_{0,c1}, S_{1,c1}, C_{2so,c1}$ $C_{3,s3}, S_{0,c2}$ $C_{2so,c1}$

Since a snapshot contains metadata, such as addresses of the blocks where the data is located rather than the data itself, the snapshot can be created quickly relative to the time required to create a traditional backup containing all the data, and without affecting the execution of the operating system or of running applications. As it contains only addresses, the snapshot is read-only, enabling actual backup of the data to occur as a background process.

Redirect-on-write (ROW) is an operationally efficient methodology, especially in terms of required disk space, for preserving snapshot data. With ROW, only changed data is written to the storage pool designated for snapshot processing, thus eliminating copying the original data block. The operating system, or a sub-component such as a logical volume manager, uses a system of pointers to track the state and location of the data blocks from the snapshot and their ROW locations. This leaves the snapshot's point-in-time-view intact.

As shown in FIG. 2, a snapshot may have one or more clones, which in turn, may have one or more snapshots. This is typically seen in a cloud computing environment or other similar large-scale cluster where provisioning operating system images on the servers or virtual machines can be an operational challenge. One possible solution is to have multiple clones of a snapshot of an operating system image. For example, each clone can be customized with additional software, depending upon customer requirements. Following customization, a snapshot may be created, as in $S_{0.c1}$, $S_{1.c1}$ which are descendants of parent clone, $C_1.s_0$.

When the clone is first created, all of its data blocks are inherited from its parent snapshot. An inherited data block is one that shares the same physical location reference in the clone object as in the parent object. Over time the inherited data blocks can be modified in the clone as a result of ROW operations, thus becoming owned by clone. A snapshot created from the clone inherits the clone's data blocks, including those data blocks the clone currently inherits from its parent snapshot. These inherited data blocks are shared by the parent snapshot, the clone, and the snapshot that is created from the clone, and may also be shared by the root file that is the parent of all the child objects. An inherited data block is not freed on ROW since the inherited data block is still referenced in the snapshot parent object that created the clone object. The inherited data block is also not freed, for example, if the clone object has a snapshot descendant that references the inherited data block.

A clone or snapshot may be split from its parent object, such as splitting clone $C_{1.s0}$ from its parent $S_0$. In that case, all inherited blocks become isolated. Isolated data blocks are those which were inherited by a clone and have subsequently been duplicated to a new location for the clone and its descendants. Splitting the clone from its parent snapshot allows the parent snapshot to be removed if desired. It also allows the parent snapshot and clone to be targeted to different storage devices based on speed of the storage devices, referred to as tiers of storage. In general, splitting a clone locates all data blocks inherited from the clone's parent snapshot by the clone and the clone's descendants, and duplicating the inherited blocks to a new storage pool for the clone to address. For a clone with snapshots, such as clone $C_{1.s0}$ and its snapshots $S_{0.c1}$, $S_{1.c1}$, the data blocks inherited from the parent snapshot $S_0$ may be shared between the clone $C_{1.s0}$ and its descendants, $S_{0.c1}$, $S_{1.c1}$, $C_{2.S0.c1}$, or shared among just a subset of the clone's descendants. If each occurrence of the data block is moved to a new location, there easily could be not enough space in the filesystem to address all of the required copies of the data blocks. For unchanged data blocks, more than one object, i.e., clone or snapshot, can point to the same data block in the filesystem. However, using snapshot and clone management 42 (FIG. 1), the isolated data blocks are marked uniquely to indicate new ownership of the data block and to indicate they are no longer shared with the parent snapshot or the parent clone. Unlike inherited data blocks, isolated data blocks may be freed on ROW since they are no longer shared between the parent snapshot object and the child clone object, so long as the isolated data blocks are not shared, i.e., inherited by a snapshot descendant of the child clone object.

Figure 3:
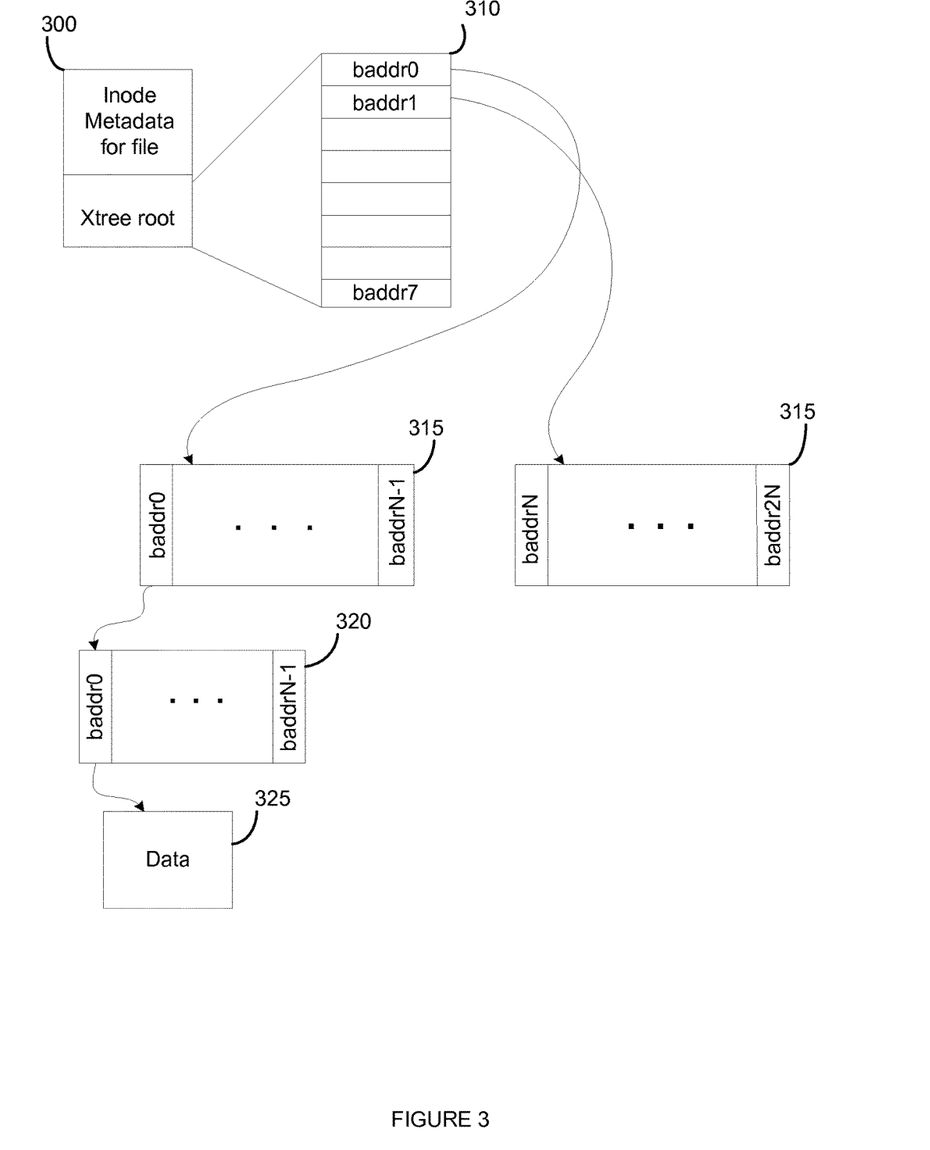
FIG. 3 illustrates an index node (inode) extent tree (xtree) layout.

FIG. 3 illustrates an index node (inode) extent tree (xtree) layout as used by snapshot and clone management 42 (FIG. 1). Snapshots and clones exist as files in filesystem storage, such as on SAN 15 or storage 34 (both of FIG. 1), and each file in a filesystem is represented by an inode 300. When a new snapshot or clone is created, an inode 300 structure that describes the object is also created. Each inode 300 includes metadata describing the object it represents, such as: identity of the object; file type; file size; generation number; access permissions; storage tier identifier; ownership; and status flags. Each inode 300 also includes the xtree root address that points to the location of the xtree root node 310 of the parent (i.e., ancestor) snapshot or clone from which this snapshot or clone is created. The xtree root node 310 includes at least one logical block address, here shown as baddr0, baddr1, and baddr7. A logical block address includes: a physical data block address; a number of data blocks addressed by the block address; a generation number; a storage tier identifier; and status flags. Each logical block address in the xtree root node 310 points to an indirect block 315 or to a data block 325. A logical block address in the indirect block 315 points either to an indirect block 315 at another level of indirection or to a leaf node 320. The leaf node 320 is the level of indirection that points directly to the physical address of the data block 325.

The number of levels of indirection depends on the size of the object (i.e., snapshot or clone), the number of logical block addresses per indirect block 315, and the number of blocks referenced by the logical block address. For example, if each data block is 4 kilobytes (KB) in size, each indirect block can hold 64 logical block address entries, and the xtree root node 310 can hold eight entries, the levels of indirection can be determined according to the following calculations. A snapshot or clone of up to 32 KB has only root block address entries, since there are eight root block address entries and each one addresses one 4 KB data block. A snapshot or clone larger than 32 KB and up to 2 megabytes (MB) in size has both root block address entries and one level of indirect blocks, since each indirect block 315 addresses 256 KB (i.e., 64*4 KB) multiplied by 8 root block address entries.

Figure 4:
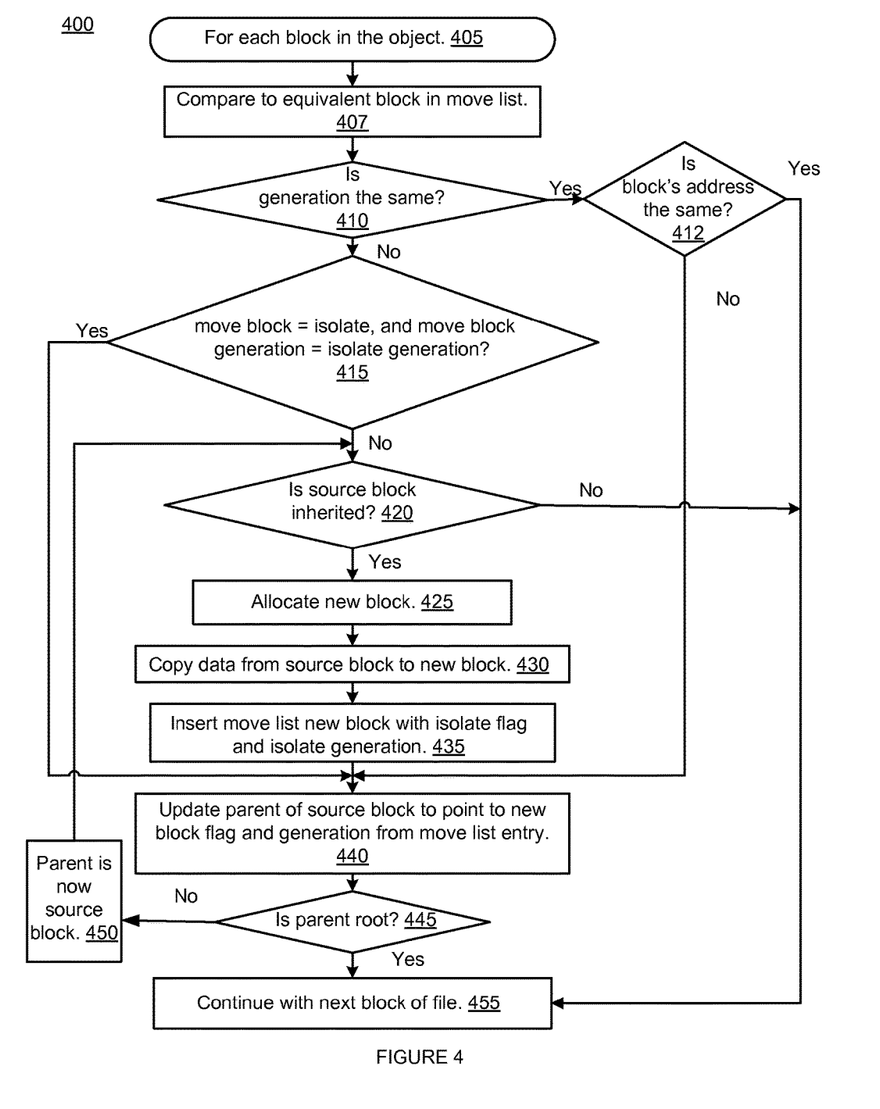
FIG. 4 shows an operational flow chart of block operations to split a clone and its descendants from the parent snapshot.

FIG. 4 illustrates an operational flow chart of block operations to split a clone and its descendants from the parent snapshot. Snapshot and clone management 42 (FIG. 1) processes each data block in the xtree of the snapshot or clone at 405 in preparation for splitting a clone from its parent.

In general when processing blocks, snapshot and clone management 42 (FIG. 1) traverses snapshot and clone objects stored within the filesystem and generates a searchable mapping, which is referred to as a move list. The move list contains information for each data block which identifies where the data block was originally located, (i.e., the source data block) and to where the data block was moved. The move list can be searched using the source data block as the search key. The parent object is searched first. The parent object can be the original file or a descendant snapshot, for example File F or snapshot $S_0$ of FIG. 2. On subsequent passes through the move list any descendant snapshots or clones based on the parent object are also searched. Descendant snapshot or clone objects can share data blocks with the parent object. A lookup in the move list is first performed to determine whether the data block has already been moved to a new location. The move list can be organized in any of a plurality of organizational structures, such as a B-tree structure that uses indirect blocks, to generate the mapping of the source address to the destination address.

At 407 the object's (i.e., snapshot or clone) source data block address is compared to the data block address in the move list. Each data block address includes a generation number, which can be a numeric value, which marks when the block was first allocated. The generation number increments over time, such that a larger generation number represents a data block that is created later in time relative to the same data block having a smaller generation number. When a snapshot is created, the generation number is preserved as the snapshot's creation generation. When a clone is created, the creation generation of the parent snapshot is preserved as the clone's creation generation.

At 410, the generation number in data block in the move list is compared to that in the object. If they are not the same, then at 415 snapshot and clone management 42 (FIG. 1) performs a series of checks to determine how to process the current block. If the isolate flag in the move list entry is set, and the creation generation in the destination of the move list block entry is the same as the isolate generation, then processing continues at 440. However, if any of these tests fail, then if at 420 the source block is inherited, a new block is allocated at 425. This is the isolated block for the inherited block. If at 420 the source block is not inherited, processing continues with the next block at 455.

At 430, the data is copied from the source block to the newly allocated block. At 435, a new move list entry is inserted showing the new destination address of the isolated source data block. The move list entry also has the isolate flag and isolate generation set to indicate that the block is isolated from the parent object as a result of the split operation. The isolate generation is set to the creation generation of the clone's oldest snapshot, or to an incremented creation generation value, depending on whether the clone has snapshots. At 440, the block address in the clone object's xtree is updated with the block address, the flag value, and the generation from the destination of the move list entry. At this stage of the process, the flag value may be set to isolate. At 445, if the parent block of the current block being processed is at a root block level in the xtree, processing continues to the next data block of the object at 455. If the parent block, at 445, is not a root block, then the parent block is identified as the source block at 450, and processing continues at 420.

At 410, the generation number in data block in the move list is compared to that in the object. If they are the same and at 412 the blocks have the same address, then no further processing is required for this block. Processing continues to the next block of the object at 455. If the generation number is the same, but the blocks do not have the same address, then processing continues at 440.

Figure 5:
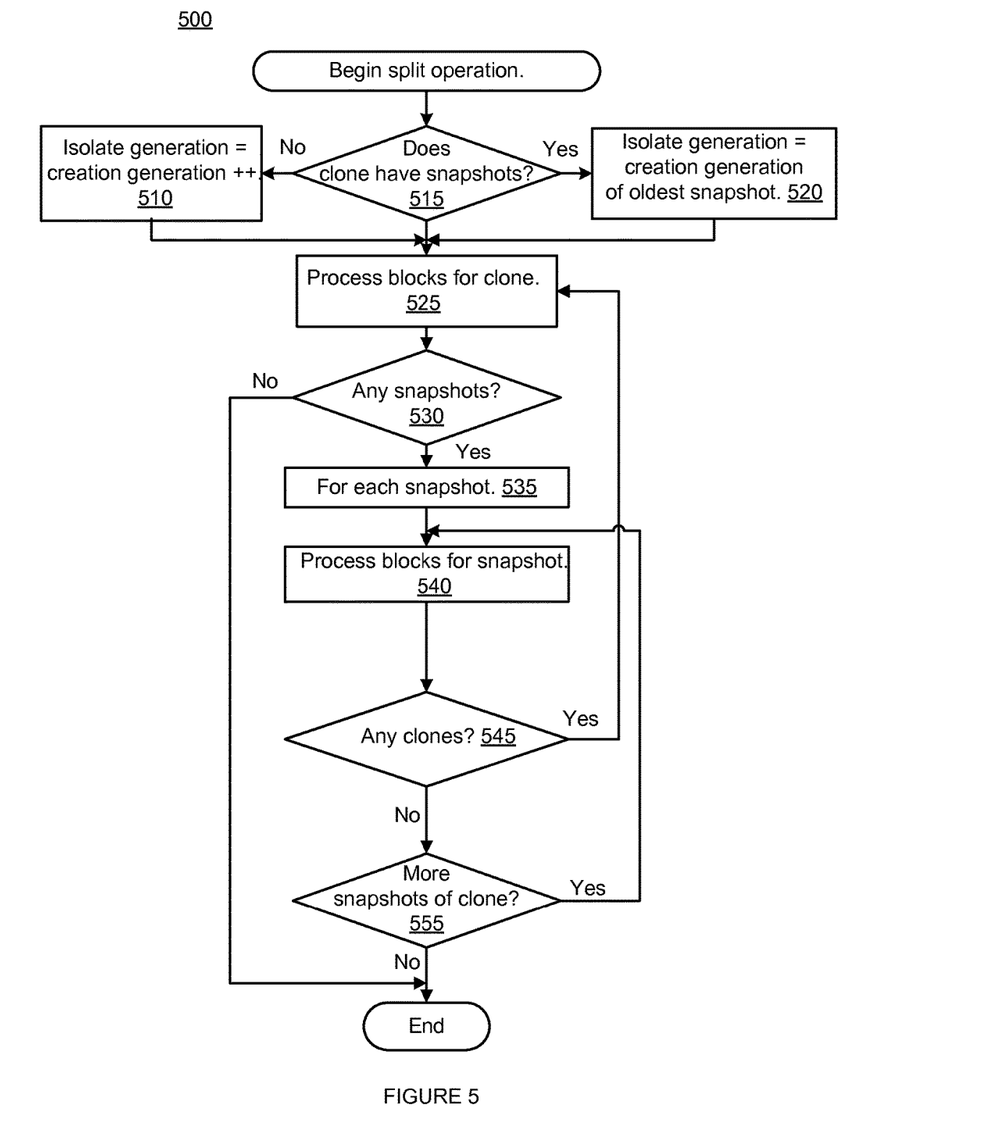
FIG. 5 shows an operational flow chart of processing files, snapshots, and clones to split a clone from the parent snapshot.

FIG. 5 illustrates splitting a clone from its parent snapshot. Algorithm 500 of snapshot and clone management 42 (FIG. 1) processes each clone or snapshot object of a file using algorithm 400 (FIG. 4) to process the blocks of each clone and snapshot. The clone splitting operating can be manually initiated, for example, by a systems administrator inputting a command to split an object from its parent file. The clone splitting operation may also be initiated automatically, as a result of systems software deploying copies of install images to client servers. If at 515, the clone has at least one snapshot, at 520 the isolate generation is set to the creation generation of the oldest snapshot descending from the clone. Otherwise, at 510 the creation generation of the clone is incremented, and becomes the isolate generation. At 525, blocks of the clone are processed according to the algorithm 400 of FIG. 4.

If at 530, the clone has descendant snapshots, then at 535 for each snapshot, the blocks of the snapshot are processed at 540, according to the algorithm 400 of FIG. 4. Similarly, at 545 if there are clones that are descendants of these snapshots, then at 525 the blocks of each clone are processed according to the algorithm 400 of FIG. 4 and the snapshot and descendant clones are similarly processed. At 555, if there are more snapshots of the clone, for example, Clone $C_{1\_s0}$ of FIG. 2, these snapshots are processed according to the algorithm 400 of FIG. 4.

Figure 6:
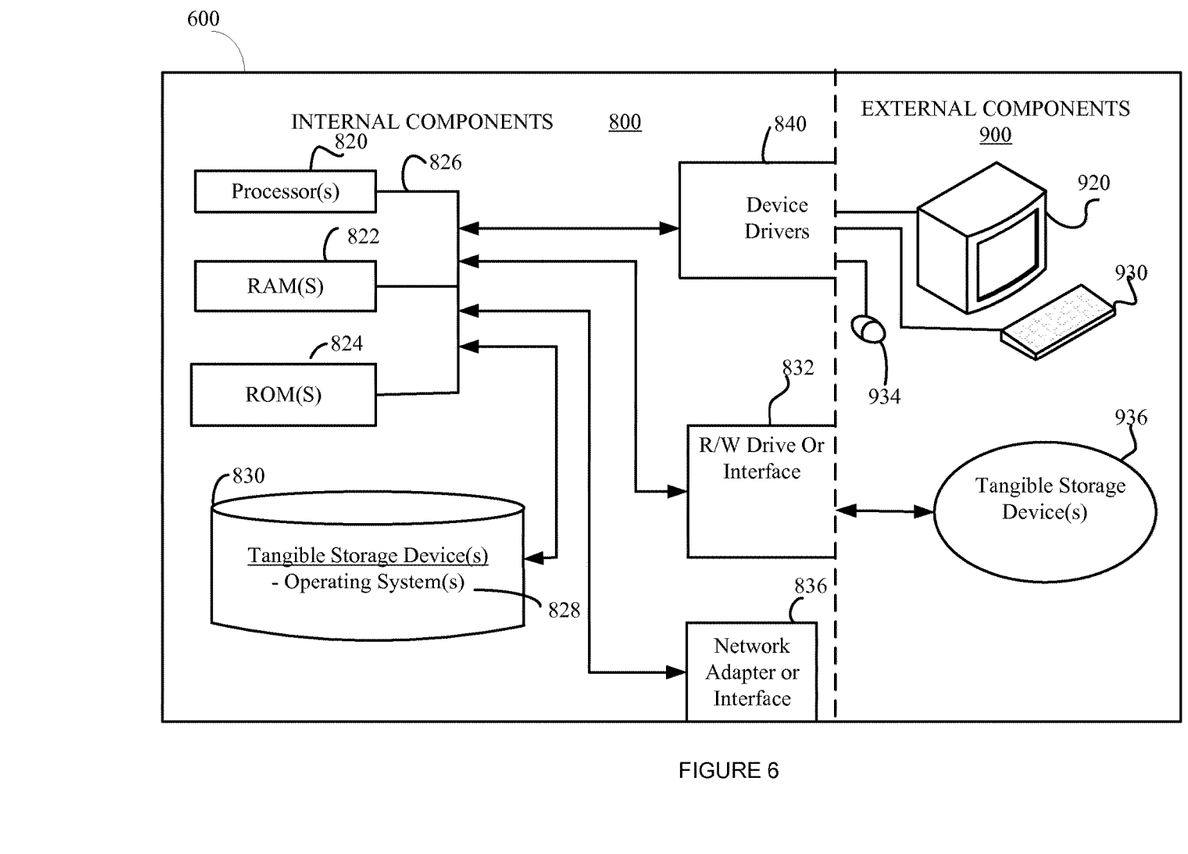
FIG. 6 is a schematic block diagram of hardware and software of the computer environment according to an embodiment of the processes of FIGS. 4-5.

Referring now to FIG. 6, computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 4-5; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer-implemented method for splitting a clone object from a parent object wherein the clone object includes at least one snapshot, the method comprising:
  receiving a command to split the clone object from the parent object and a mapping of source data blocks in the parent object to destination data blocks in the clone object;
  for each source data block in the mapping having an isolate flag set, copying the source data block to a logical address of the destination data block;
  incrementing an isolate generation in the destination data block in the mapping, wherein the clone object has no descendant objects; and
  based on the clone object having descendant objects, setting the isolate generation in the destination data block in the mapping to the isolate generation of the oldest descendant object of the clone object.

2. The method of claim 1, wherein the isolate generation comprises:
  an incremented creation generation of the clone object when the clone object has no snapshots; and
  a creation generation of an oldest snapshot of the clone object when the clone object has at least one snapshot.

3. The method of claim 1, further comprising:
  updating an index node extent tree (xtree) layout of the clone object with the address of the new destination data block, the indicator that the new destination data block is isolated, and the isolation generation; and
  identifying a parent block of the new destination data block as the source data block wherein the parent block is not a root block in the index node extent tree layout.

4. The method of claim 1, wherein the xtree layout of the clone object includes a plurality of logical block addresses organized in a hierarchy of: a root node, one or more indirect blocks, and one or more leaf nodes that point to one or more physical data blocks.

5. The method of claim 4, wherein the logical block address includes:
  a physical data block address;
  a number of data blocks addressed by the physical block address;
  a generation number;
  a storage tier identifier; and
  status flags.

* * * * *